April 30, 1935.   A. URFER   1,999,347
ELECTRIC TACHOMETER
Filed April 5, 1932   3 Sheets-Sheet 1
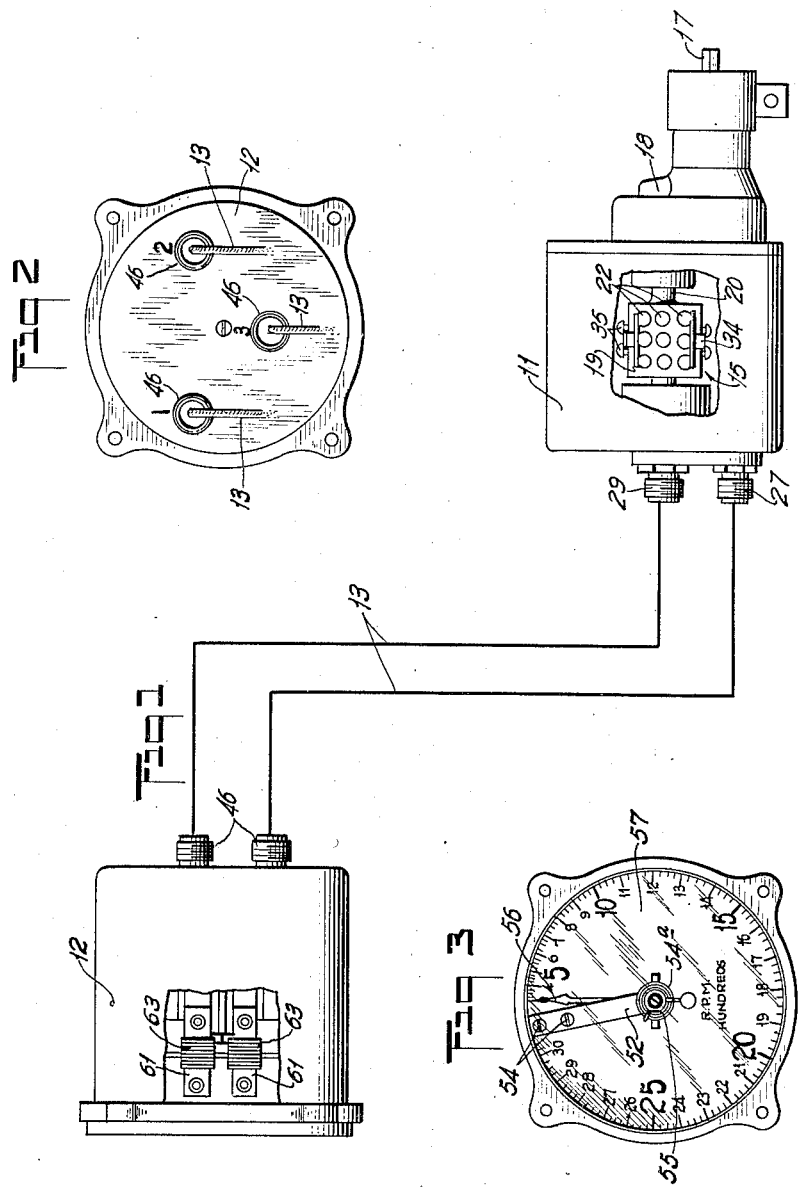
INVENTOR.
ADOLF URFER.
BY Stephen Gerstvik
ATTORNEYS.

April 30, 1935.  A. URFER  1,999,347
ELECTRIC TACHOMETER
Filed April 5, 1932  3 Sheets-Sheet 2
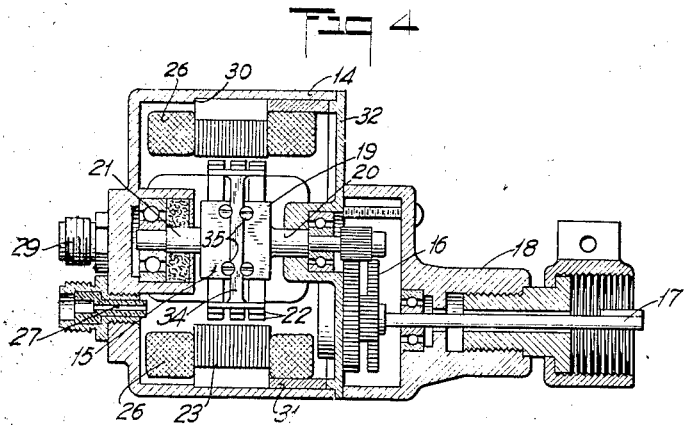
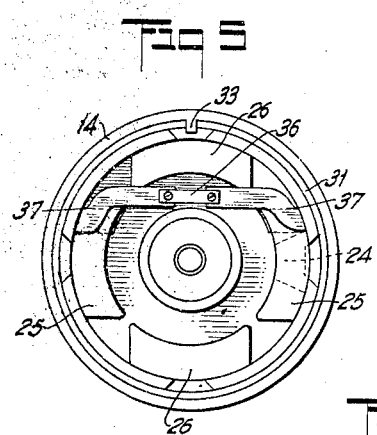
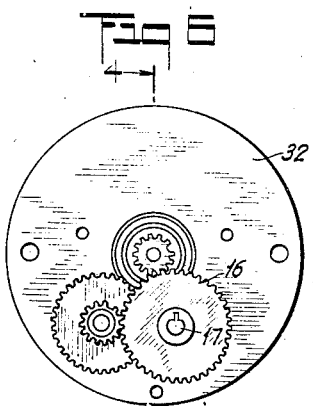
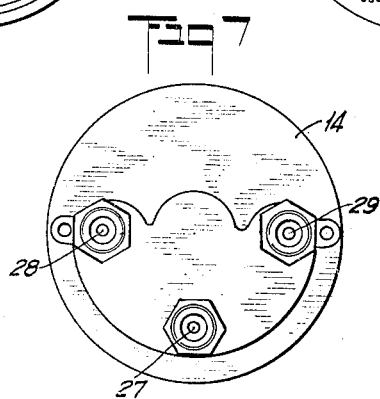
INVENTOR.
ADOLF URFER.
BY Stephen Cerstvik
ATTORNEY April 30, 1935.  A. URFER  1,999,347
ELECTRIC TACHOMETER
Filed April 5, 1932  3 Sheets-Sheet 3
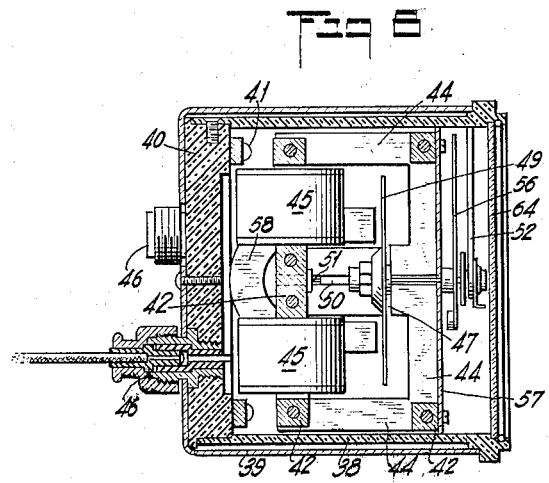
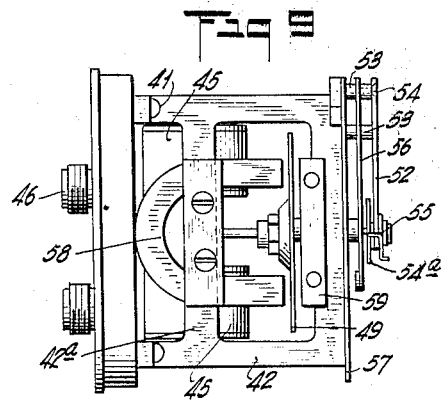
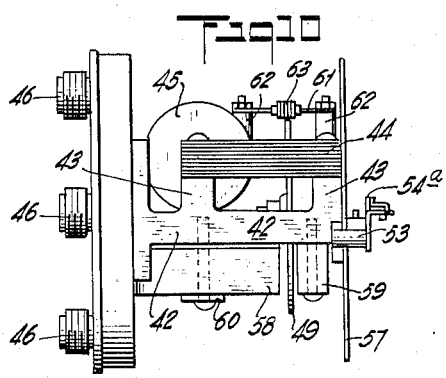
INVENTOR.
ADOLF URFER.
BY Stephen Cerstvik
ATTORNEY.

Patented Apr. 30, 1935

1,999,347

UNITED STATES PATENT OFFICE 1,999,347

ELECTRIC TACHOMETER

Adolf Urfer, Richmond Hill, N. Y., assignor to Bendix Aviation Corporation, South Bend, Ind., a corporation of Delaware Application April 5, 1932, Serial No. 603,433

10 Claims. (Cl. 175—183)

This invention relates to a device for indicating the speed of a rotating member, and more particularly to an electric tachometer.

One of the objects of the invention is to provide a novel tachometer of the induction type which is so constructed as to avoid inaccuracies resulting from temperature changes in the instrument.

Another object of the invention is to provide an instrument of the above character which embodies novel means for compensating for permeability changes in both the generator and indicator elements of said instrument, whereby the speed of a rotating member may be accurately determined at all times.

Another object is to provide a novel electric tachometer utilizing a two-phase generator circuit and a double magnetic field circuit, the instrument being of the induction type.

A further object is to provide a novel tachometer of the induction type wherein the readings are substantially independent of voltage and are proportional to the current frequency being generated, and hence to the speed of the rotating member to be observed.

Other objects of the invention include the provision of an electrical tachometer embodying a novel generator unit and a novel indicator unit; a novel tachometer which is accurate over a wide range of speed; one of long life, inexpensive manufacture, and ready installation, and one which is substantially free from inaccuracies due to changes in permeability of the elements thereof.

The above and other objects will appear more fully hereinafter in the detailed description of the invention taken in connection with the attached drawings. It is to be expressly understood, however, that the drawings are for the purpose of illustration only and are not designed as a definition of the limits of the invention, reference being had, primarily, for this purpose to the appended claims.

In the drawings, wherein like reference characters refer to like parts throughout the several views:

Fig. 1 is a side elevation of an improved tachometer embodying the present invention, a portion of the instrument casing being broken away to show details of the generator rotor construction;

Fig. 2 is a rear end view and Fig. 3 is a front end view of the indicator unit shown in Fig. 1;

Fig. 4 is an axial section, taken along line 4—4 of Fig. 6, illustrating a preferred form of generating unit or element employed in carrying out the present invention;

Figs. 5, 6 and 7 are detail views illustrating certain features of the mechanism shown in Fig. 4;

Fig. 8 is a longitudinal section of an indicating unit or element that is preferably employed in carrying out the present invention;

Fig. 9 is a side elevation of the indicating unit with the casing removed and taken 180 degrees from the view shown in Fig. 8; and Fig. 10 is a side elevation of the parts shown in Fig. 9 after the latter have been displaced 90 degrees.

In the form illustrated, the novel tachometer constituting the subject matter of the present invention comprises a generating unit or element 11 and an indicating element 12, these two elements being shown as connected by electrical conductors 13 in order that speed readings may be made at a distance from the rotating member, the speed of which is to be observed. For example, if the tachometer is employed on an aircraft, the generator unit 11 may be drivably connected to a suitable member of the engine, while the indicator unit 12 may be mounted on the instrument panel.

In the illustrated embodiment of the invention, the generator element comprises a casing 14 in which is mounted a rotor 15 adapted to be driven by a member, the speed of which is to be observed. Preferably, the rotor is driven through a step-up train of gearing 16 operatively connected to a shaft 17 which constitutes the element for connecting the rotor to the rotating member (not shown) whose speed is to be observed.

A S. A. E. engine tachometer connection, indicated generally at 18, is provided for securing the generator element or unit in operating position. Any suitable type of connecting means and step-up gear train may be employed, but when the tachometer is applied to aviation engines, for example, the construction is preferably such that rotor 15 operates at a speed substantially higher than that of the connecting shaft 17; for example, a 12 to 1 ratio may be used. A speed of 500 to 600 R. P. M. of the rotor is desirable to insure saturation of the cores of field coils employed in the indicator unit as will appear more fully hereafter.

As shown, the rotor comprises a brass or bronze block 19 provided on opposite sides with integral trunnions 20, 21 journaled in suitable bearings carried by casing 14. A plurality of bar magnets 22 extend through openings in block 19, said magnets preferably having a pressed fit in the openings. In the illustrated embodiment, nine magnets are employed (Fig. 1), the magnets being arranged in three rows of three magnets each.

The stationary field comprises a laminated iron core 23 having four pole pieces 24 carrying two sets of coils 25 and 26. The centers of these coils are connected together and lead to the outlet terminal 27. The other ends of the coils are connected to terminals 28 and 29, respectively (Fig. 7). Since one coil set is positioned at 90 degrees with respect to the other, a two-phase current will be obtained in the output leads 13. No slip rings or rotating collectors are required.

Casing 14, which is preferably formed of insulating material such as bakelite, is provided interiorly with an annular shoulder 30 against which bears one side of the laminated iron core 23 of the field. A spacing ring 31, which may be formed of aluminum, bears at one edge against the opposite side of the laminated core and at its other edge against a cover plate 32 removably attached in any suitable manner to casing 14, whereby the winding and core are held against movement relative to the casing. As shown, member 31 is constituted by a split ring (Fig. 5) and is held against rotation in the casing 14 by means of lug 33 which is preferably formed integrally with said casing.

In order to insure accurate readings, it is highly desirable to compensate for permeability changes due to variations in temperature resulting from continuous, high speed operation of the generator unit. To this end, the rotor and field of the generating element are each provided with compensating means. As illustrated, the rotor is provided, on each side thereof, with a compensator 34 which is substantially I-shaped, said compensator being formed of special alloys (such as iron-nickel or iron-copper as will be understood in the art) which have a very large permeability change as a function of temperature. Preferably, the outer ends of the three outer magnets 22 on each side of the rotor have their faces flattened to receive the outer transverse ends of the compensators 34. The central portion of each compensator is bent outwardly so that it can rest against the face of block 19 and is held in position on said block as by means of four screws 35.

The alloy compensator 36 for the field (Fig. 5) extends across the air gap of said field to compensate for variations of permeability in the iron of the field structure. As shown, compensator 36 is held in place by means of curved members 37 which are substantially U-shaped and which may be attached to the opposite ends of the bar as by means of screws. The bight of each U-shaped supporting member 37 passes between the adjacent coil and the split ring 31 while the inner arm of each supporting member is bent inwardly to lie along the face of adjacent pole 24. Preferably, members 37 are formed of the same alloy as that used in compensator 36.

Means are provided for converting the electrical energy developed by generator element 11 into torque, the latter being available to move an indicating arm through an angular distance that is proportional to the frequency of the generator current and hence to the speed of rotation of the member to which the tachometer is operatively connected. For this purpose, there is provided an indicating unit or element 12 having a casing 38 (Fig. 8) formed of suitable insulating material, such as bakelite, for example. In order that the indicator may be shielded against interference with other instruments, such as a compass, a magnetic shield 39 is preferably provided around the casing 38. Secured to the base 40 of the casing 38, as by means of suitable screws 41, is a substantially rectangular frame 42 formed of bakelite or other suitable insulating material, which frame constitutes a support for the major elements of the indicator.

As shown more clearly in Fig. 10, the frame 42 is provided with laterally projecting arms 43 to the outer ends of which are suitably attached a pair of substantially rectangular laminated cores 44. Mounted in a position to surround the rear vertical portion of each of the cores 44 are coils 45 that are connected to the respective phases of the generator 11 by means of three terminals 46, located in the base or rear end of casing 38, 40, and the leads 13. As mentioned above, the rectangular cores 44 of coils 45 are energized to the saturation point to eliminate the effect of change of voltage, whereby the indicator is responsive to frequency only, and hence to the speed of rotation of the member to be observed.

It will be noted that cores 44 are not continuous but are provided with air gaps 47 and 48 in the adjacent horizontal portions thereof (Fig. 8), and into said gaps extends the outer portion of a thin disc 49 that is preferably formed of aluminum and is mounted for angular movement about a fixed center. The air gaps 47 and 48 being in the adjacent horizontal portions of the cores, act upon the disc over a small V sector area thereof. As shown, disc 49 is attached in any suitable manner to, and is carried by a spindle 50, the latter being supported at its lower end in a jewel bearing 51 carried by a portion 42a of the rectangular insulating frame. The upper end of spindle or staff 50 is supported in a jeweled bearing carried by the free end of a flat bar or arm 52 attached by a pair of suitable spacers 53 and screws 54 (Figs. 3 and 9) to the outer surface of the insulating frame 42.

The eddy currents, and hence magnetic fields, alternately induced in disc 49 by the double magnetic field circuit 44, 45, described above, and the magnetic field of said circuit which is in proper phase at the instant with the disc field, coact to impart a torque to the disc, whereby the latter tends to rotate. This torque is proportional to the field strength and the frequency of change of field. Moreover, since cores 44 of coils 45 are energized to the saturation point, the torque is substantially independent of voltage and is proportional to the frequency, and hence to the speed of rotation of the member to which the tachometer is operatively connected.

In order to visually indicate the amount of torque applied to the disc, and hence the speed of rotation of the member to be observed, yielding means are provided for opposing and restricting movement of disc 49 about the axis constituted by staff 50. As shown, the yielding means are constituted by a hairspring 54 having its inner end secured to staff 50 and its outer end attached, as by solder, to a downwardly extending arm 55 adjustably secured to the free end of bar 52, whereby the spring may be calibrated.

Attached to the spindle or staff 50 directly in the rear of hairspring 54 is a pointer or indicator hand 56 adapted to move over a dial 57 which is preferably provided with a radial slot in the plane of bar 52 to facilitate assembly, the dial being secured as by means of screws to frame 42. The spacing sleeves 52 and 53 constitute a stop to prevent counter-clockwise movement of the hand 56 past the zero point of the scale on the dial, whereby damage to the hairspring is prevented. In connection with the scale, it will be noted that the divisions, which are shown as angular distances representing 100 R. P. M., are substantially equal throughout since the instrument is adapted to be operated on the saturation portion of the field curve for cores 44.

Preferably, some suitable means are provided for damping the movements of disc 49, and hence hand 56. As shown, the damping means is constituted by a permanent horseshoe magnet 58 provided with a keeper 59. The magnet is removably attached to frame 42, as by means of a plate 60 and suitable screws, and its poles extend to a point closely adjacent the inner face of disc 49 at a point substantially 180 degrees from the gaps in cores 44. Keeper 59 is secured to frame 42 adjacent the outer face of disc 49 and in the plane of magnet 58.

Means are provided for compensating for permeability changes in cores 44 resulting from changes in temperature therein. For this purpose there is preferably provided a pair of compensators constituted by magnetic shunts 61 extending across the gaps of the double magnetic circuit 44, 45. Spacing sleeves 62, secured in any suitable manner to cores 44, may be employed to hold shunts 61 clear of the periphery of the angularly movable disc 49. Preferably, the special alloy compensators differ from those employed in the generator element in that a number of turns of silk covered, fine wire 63 are wound on the central portions of each compensator or shunt 61. The coils of fine wire 63 constitute, in effect, compensators for the compensating strips 61 in that they tend to smooth out the permeability curve of said strips.

In operation, the rotation of the member (not shown) whose speed is to be observed is transmitted to rotor 15 through shaft 17 and the step-up gear train 16, whereby a two-phase current is generated. The alternating fields set up in disc 49 and the double magnetic circut 44, 45 result in a torque being imparted to disc 49, whereby the latter is given an angular deflection that is opposed by the calibrated hairspring 54. Since this torque is proportional to the frequency of the two-phase current, it is a function of the speed of rotation of the member being observed. The angular deflection of the disc is imparted to pointer 56 associated with the R. P. M. scale of the dial whereby the desired readings may be made by observing the position of said pointer through the cover glass 64.

There is thus provided a novel tachometer which is adapted to give substantially exact R. P. M. indications irrespective of temperature and permeability changes resulting from continuous, high speed operation. As will be understood in the art, care should be taken in calibrating and seasoning the hairspring 54. Furthermore, a relatively high ratio, step-up gear train should be used in the generator unit to insure that the output of said unit will be effective to saturate cores 44 since, if this is not done, an indicator scale of equal divisions cannot be employed. Changes in permeability of the various elements of the tachometer are effectively compensated so that the angular deflection of the induction disc 49 and needle 56 is proportional to the frequency of the two-phase current, and hence to the R. P. M. or speed of the rotating member to be observed.

The parts of the instrument are particularly adapted for ease in assembly. For example, the field of the generator element of the instrument has a sliding fit in casing 14 and is fixedly held in said casing by shoulder 30, split ring 31, and cover plate 32. By removing plate 32 from the casing and detaching the ends of the field coils from terminals 27, 28, and 29, the field structure may be quickly removed from said casing. Rotor 15 is removable with the cover plate 32, the inner bearing for the rotor shaft being held in the casing by suitable retainer means. By providing a radial slot in the dial, it can be easily secured in position after arm 52, spring 54, pointer 56, etc. have been assembled. Various changes may be made in the details of construction of the instrument, and in the arrangement of parts, and accordingly reference will be had primarily to the appended claims for a definition of the limits of the invention.

What is claimed is:

1. In a tachometer, an indicating unit comprising a casing, a frame positioned therein, a double magnetic field circuit having air gaps, the cores for said circuit being mounted in said frame, a disc pivotally mounted in said frame and having a V-sector portion thereof extending into said gaps, and damping means for the disc mounted on said frame, said damping means being constituted by a permanent magnet having its polar ends disposed in a common plane parallel to the plane of said disc and spaced a predetermined distance therefrom, said means affecting said disc at a point remote from the double magnetic field circuit.

2. In a tachometer, an indicating unit comprising a casing, a frame positioned therein, a double magnetic field circuit having air gaps, the cores for said circuit being mounted in said frame, a disc pivotally mounted in said frame, and having a V-sector portion thereof extending into said gaps, damping means for the disc mounted on said frame, said damping means being constituted by a permanent magnet having its polar ends disposed in a common plane parallel to the plane of said disc and spaced a predetermined distance therefrom, and a cooperating bar magnet or keeper having its polar axis disposed in parallelism with the plane of said disc but on the side of said disc opposite to that occupied by said first named magnet.

3. In a tachometer, an indicating unit comprising a casing, a frame positioned therein, a double magnetic field circuit having adjacent air gaps, the cores for said circuit being mounted in said frame, a disc pivotally mounted in said frame, and having a V-sector portion thereof extending into said gaps, magnetic damping means for the disc mounted on said frame, and acting on said disc at a point remote from said double magnetic field circuit.

4. An electric tachometer indicating unit comprising a base having a plurality of supporting members projecting from the plane of the base to constitute a unitary supporting frame, a pair of flat rectangular substantially C-shaped cores carried by said frame and positioned adjacent each other in a common plane perpendicular to the plane of said base and having air gaps adjacent each other in a common plane parallel to the base, a coil wound on each core, said coils being connected for two phase operation and energization by a two phase alternating current whereby said cores are magnetized in alternate sequence, a disc of non-magnetic material having a shaft secured thereto projecting from either side thereof in the center and journaled in said frame so that said disc may rotate, said disc having a V sector portion extending into the air gaps of said cores whereby eddy currents are produced in said disc upon energization of said coils for producing magnetic fields which react with the fields produced in the cores by the coils to cause rotation of said disc, a permanent magnet having its poles cooperating with another portion of the disc for damping the latter, a dial mounted on said frame and having the shaft projecting therethrough, a pointer on said shaft and cooperating with said dial, an arm carried by the frame and extending over the dial to the center of the latter, said arm carrying one of the bearings of the shaft, and a hair-spring having one end connected to the shaft and the other end to the arm for opposing the movement of the disc and pointer.

5. In an alternating current electric tachometer indicating unit, comprising a pair of closed cores positioned adjacent each other in a common plane and having air gaps adjacent each other in a common plane perpendicular to the plane of said cores, a coil wound on each core and connected together for energization by a two-phase alternating current and in such a manner that the current in one coil is 90° out of phase with the current in the other coil whereby said cores are magnetized in alternate sequence, a disc of non-magnetic material pivotally supported in a plane perpendicular to the plane of the cores and having a V sector portion extending into the air gaps of said cores whereby eddy currents are produced in said disc upon energization of said coils for producing magnetic fields which react with the fields produced in the cores by the coils to develop a torque on said disc which is substantially proportional to the frequency of alternation of the fields of the cores, a spring opposing the movement of said disc under the influence of the torque developed by the fields in the disc and the fields of the cores, and indicating means for measuring the torque.

6. An indicating instrument for use with a two-phase alternating current generator to constitute an electric tachometer, said instrument comprising a pair of C-shaped cores, a coil on each core, said coils being connected together for 90° out-of-phase operation and for energization by a two-phase alternating current for establishing two alternating fields substantially 90° out of phase and changing in alternate sequences at a frequency substantially proportional to the frequency of said two-phase alternating current, a metal disc of non-magnetic material pivotally supported in and acted upon by said alternating fields substantially at the periphery of said disc and on a V sector thereof to produce eddy currents in said disc which create magnetic fields reacting with said alternating fields to develop a torque on said disc which is substantially proportional to the frequency of said alternating current, means opposing the movement of said pivotally supported disc under the influence of the torque developed by the two alternating current fields, and means including an element rotatable with said disc to measure torque.

7. An alternating current tachometer indicating unit for use with a two-phase alternating current generator, comprising a pair of core members having air gaps which are adjacent each other in a common plane, a coil on each core member, said coils being connected for 90° out-of-phase operation by a two-phase alternating current whereby said cores are magnetized in alternate sequence, a pivotally mounted metal disc of non-magnetic material having a V sector portion extending into the air gaps of said cores whereby eddy currents are produced in said non-magnetic disc upon energization of said cores for producing magnetic fields which react with the fields alternately produced in the core members by said coils to cause rotation of said disc as a function of the frequency of alternate magnetization of the coils by the two-phase alternating current, means opposing the rotation of said pivotally supported disc under the influence of the torque developed by the alternate fields of the coils and the eddy current fields produced in said disc, and means for indicating the torque in terms of a function of the frequency.

8. An alternating current tachometer indicating unit for use with a two-phase alternating current generator, comprising a pair of core members having air gaps which are adjacent each other in a common plane, a coil on each core member, said coils being connected for 90° out-of-phase operation by a two-phase alternating current whereby said cores are magnetized in alternate sequence, a pivotally mounted metal disc of non-magnetic material having V-sector portion extending into the air gaps of said cores whereby eddy currents are produced in said non-magnetic disc upon energization of said cores for producing magnetic fields which react with the fields alternately produced in the core members by said coils to cause rotation of said disc as a function of the frequency of alternate magnetization of the coils by the two-phase alternating current, means opposing the rotation of said pivotally supported disc under the influence of the torque developed by the alternate fields of the coils and the eddy current fields produced in said disc, means for indicating the torque in terms of a function of the frequency, and magnetic damping means coacting with said disc at a point apart from said cores and air gaps 9. An indicating instrument for use with a two-phase alternating current generator to constitute an electric tachometer, said instrument comprising a pair of C-shaped cores, a coil on each core, said coils being connected together for 90° out-of-phase operation and for energization by a two-phase alternating current for establishing two alternating fields substantially 90° out-of-phase and changing in alternate sequences at a frequency substantially proportional to the frequency of said two-phase alternating current, a metal disc of non-magnetic material pivotally supported in and acted upon by said alternating fields substantially at the periphery of said disc and on a V sector thereof to produce eddy currents in said disc which create magnetic fields reacting with said alternating fields to develop a torque on said disc which is substantially proportional to the frequency of said alternating current, means opposing the movement of said pivotally supported disc under the influence of the torque developed by the two alternating current fields, means including an element rotatable with said disc to measure torque, and magnetic damping means coacting with said disc.

10. In an electric tachometer, an indicating unit comprising a casing, a frame positioned therein, a double magnetic field circuit having air gaps, the cores for said circuit being mounted in said frame, a disc pivotally mounted in said frame and having an edge of a V-sector portion thereof extending into said gaps, and magnetic damping means cooperating with said disc at a point apart from said air gaps.

ADOLF URFER.